United States Patent
Eriksen et al.

(10) Patent No.: US 6,736,170 B2
(45) Date of Patent: May 18, 2004

(54) DEVICE FOR SEALING AND INFLATING AN INFLATABLE OBJECT

(75) Inventors: Steen Mandsfelt Eriksen, Græsted (DK); Henrik-Gerner Olrik, Humlebæk (DK); Joachim Georg Lodemann, Burgwedel (DE)

(73) Assignee: Continental AG, Hannover (DE)

( * ) Notice: Subject to any disclaimer, the term of this patent is extended or adjusted under 35 U.S.C. 154(b) by 0 days.

(21) Appl. No.: 10/229,287

(22) Filed: Aug. 28, 2002

(65) Prior Publication Data

US 2003/0056851 A1 Mar. 27, 2003

Related U.S. Application Data

(63) Continuation of application No. PCT/EP02/01554, filed on Feb. 14, 2002.

(30) Foreign Application Priority Data

Feb. 16, 2001 (DK) .......................................... 2001 00271

(51) Int. Cl.[7] .............................................. B65B 31/00
(52) U.S. Cl. ............................ 141/38; 141/9; 141/102; 141/105; 156/115
(58) Field of Search ............................. 141/1, 4, 5, 9, 141/38, 67, 100, 102, 105; 406/38, 146; 156/115; 152/415

(56) References Cited

U.S. PATENT DOCUMENTS

| 4,765,367 A | 8/1988 | Scott ........................... 137/607 |
| 6,283,172 B1 | 9/2001 | Thurner ........................ 141/38 |

FOREIGN PATENT DOCUMENTS

| DE | 195 45 935 A1 | 1/1997 |
| DE | 1984651 | 8/1998 |
| EP | 0 753 420 B1 | 1/1997 |
| FR | 1324352 | 3/1962 |
| WO | WO 99/14031 | 3/1999 |
| WO | WO 00/21875 | 4/2000 |

Primary Examiner—Timothy L. Maust
(74) Attorney, Agent, or Firm—Winston & Strawn LLP

(57) ABSTRACT

A device serving for sealing and inflating an inflatable object provided with an inflation valve, for example a tire. The device is of the kind that includes a pressure gas source and a container containing a sealing agent. In addition, the device includes a reversing valve for opening a first connection between the pressure gas source and the inflation valve of the object in a first position and a second connection between the pressure gas source and the container and further between this container and the inflation valve of the object in a second position. In one mode of operation, the device can be used for inflating an object having gone flat to a specified pressure, while in a second mode of operation, it can be used for sealing and inflating a punctured object. Thereby, the heavy and bulky spare wheel which drivers conventionally have in the car is rendered dispensable.

36 Claims, 13 Drawing Sheets

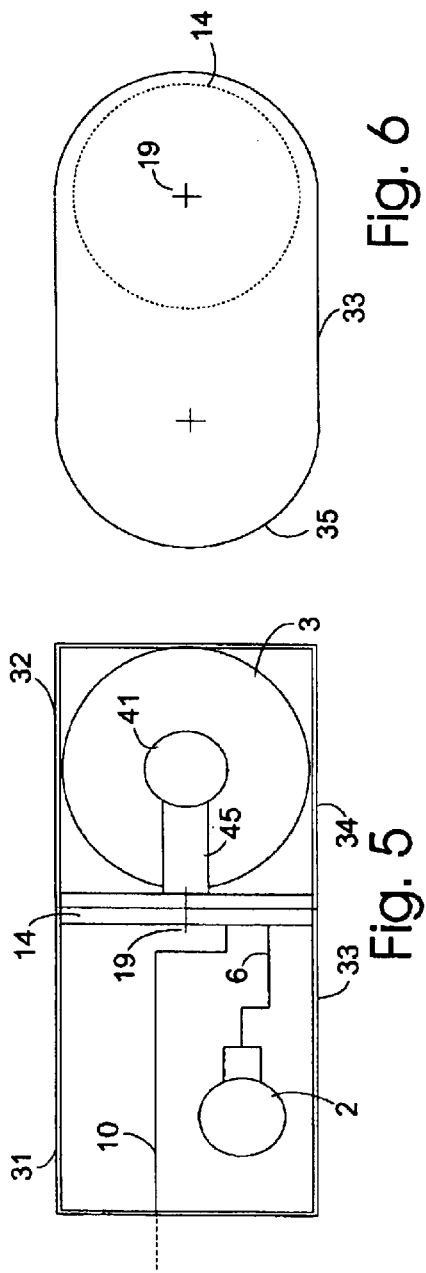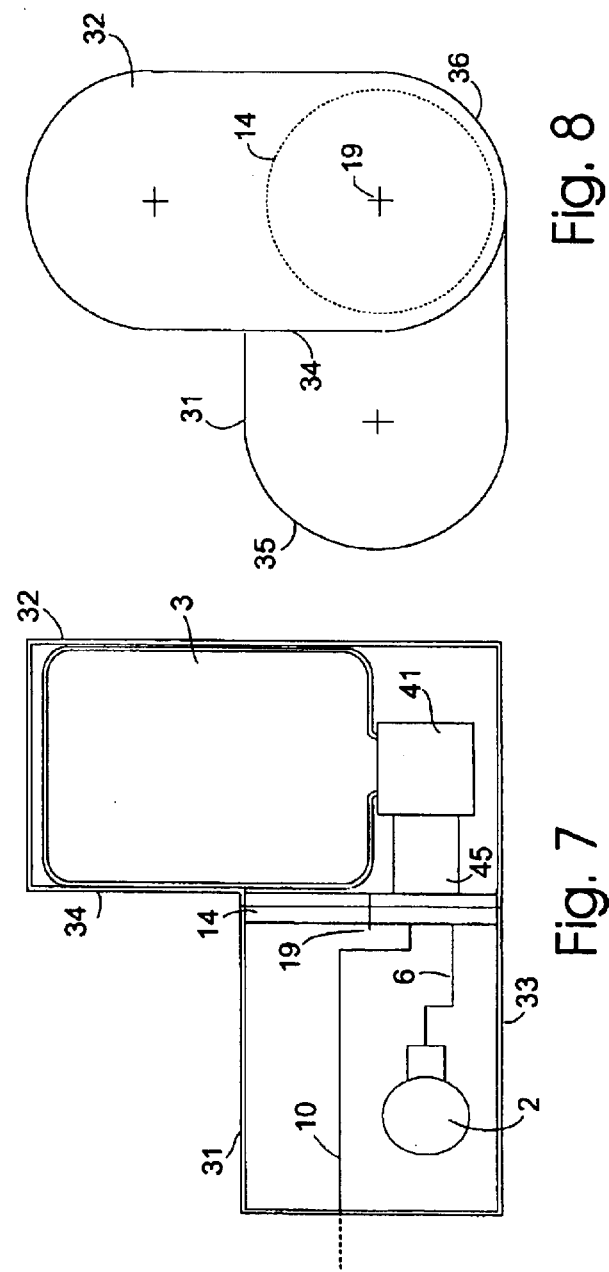

DEVICE FOR SEALING AND INFLATING AN INFLATABLE OBJECT

CROSS-REFERENCE TO RELATED APPLICATIONS

This application is a continuation of the US national stage designation of International Application PCT/EP02/01554 filed Feb. 14, 2002, the entire content of which is expressly incorporated herein by reference thereto.

BACKGROUND ART

The invention relates to a device for sealing and inflating an inflatable object which is provided with an inflation valve e.g. a tire, and of the kind that comprises a pressure gas source and a container containing a sealing agent.

Tires on cars, motorcycles and pedal cycles are in danger of, especially during driving, being penetrated by sharp objects on the road.

If a tire on a bicycle punctures, the unpleasant situation might arise that the cyclist cannot or only can continue with difficulty because it is not possible to mend the punctured tire on the spot.

To avoid getting in the same serious situation, cars are therefore usually provided with a spare wheel for replacing a punctured wheel. However, many drivers are not able to make such a change of wheel and others find the job difficult and unpleasant.

The presence of a spare wheel which the driver thus always has to have in the car furthermore poses in itself a considerable problem as the spare wheel reduces the net load of the car and occupies otherwise usable space.

With a view to eliminate the above problems, devices have therefore been developed over the years for being able to mend a punctured tire on the spot in an easy and manageable manner.

The main components of these devices are a pressure gas source, for example a compressor, and a container containing a sealing agent, for example a latex dispersion. Such a device is known from DE 195 45 935 C2, which as pressure source utilizes a compressor or a cylinder containing a propellant under pressure. The pressure source is connected to the container, which upon use is connected to the valve of the punctured tire via a tube. Thereby, the sealing agent is driven into the tire that subsequently is inflated to the specified pressure. The device is simple but on the other hand difficult to use.

A better solution is known from DE 297 16 453 U1 which describes an integrated device having a flexible container located in a pressure chamber which upon use can be gas-pressurized by a compressor. The device has a first breaking point above the container and a second breaking point in a direct connection between the compressor and the tire, which is to be sealed and inflated.

In use, the compressor will pressurize the pressure chamber. The pressure is transmitted to the sealing agent in the flexible container. Thereby, the sealing agent will break the first breaking point and now be driven into the punctured tire via the formed aperture. When the container is empty, the second breaking point will break whereby the tire is inflated.

This device has the disadvantage of its application being limited by the ability of the two breaking points to resist a certain load, and it is therefore not universally applicable.

Another device for sealing and inflating a punctured tire is known from U.S. Pat. No. 4,765,367. In this case, the container is an aerosol container containing e.g. latex, and the device is provided with a reversing valve which can be set in two positions. In one position, a connection is opened between the punctured tire and the aerosol container which thereby will empty its content of sealing agent into the tire. In a second position, a connection is opened between the tire and the compressor which now can inflate the tire. However, the tire laboriously has to be relieved of residual air before the sealing agent can be driven into the tire, and this device is therefore also difficult to use.

The thing the above devices have in common is that their application is limited to only being used for inflating a tire by simultaneously filling the tire with a sealing agent. Thus, there is a need for improvements in these type devices.

SUMMARY OF THE INVENTION

The present invention relates to a device for sealing and inflating an inflatable object provided with an inflation valve, for example a tire. The device comprises a pressure gas source and a container containing a sealing agent, and it can be used easily and effortlessly to seal and inflate a punctured object.

Another feature of the invention is to provide a device of this kind which is arranged to inflate an object to the specified pressure.

Yet another feature of the invention is to provide a device of this kind which can change between one function in which the device is suited for inflating an object which has gone flat, and a second function in which the device is suited for sealing and inflating a punctured object.

The novel and unique features according to the invention are achieved by providing the device with a reversing valve for, in a first position, opening a first connection between the pressure gas source and the inflation valve of the object and, in a second position, opening a second connection between the pressure gas source and the container and further between this container and the inflation valve of the object.

In first position, the user can use the device as a pump for e.g. inflating a tire which only has gone flat. A driver driving around with the device according to the invention will therefore always have an effective means for ensuring that the tires keep the pressure specified for exactly this type of tire. Thereby, the advantage is obtained in that the car is always running safely and most economically.

Merely by switching the valve to a second position, the user can now use the same device for sealing and inflating e.g. a punctured tire quickly and easily. In use, the pressure gas source will send pressure gas into the container containing the sealing agent which thereby is driven into the punctured tire. Then, the pressure gas continues via the container immediately to flow into the tire until the connection with the pressure gas source is disconnected when the tire is inflated to the specified pressure. This operation does not require use of aerosol containers or breaking points which limit the application of the above known devices.

The driver can effectively ensure that the puncture is sealed by driving a short distance immediately after the above operation so that the sealing agent is distributed everywhere along the interior face of the tire.

BRIEF DESCRIPTION OF THE DRAWINGS

The invention will be explained in greater detail below, describing only exemplary embodiments with reference to the drawing, in which

FIG. 5 is a diagrammatic view of the device in FIGS. 1 and 2 with the reversing valve in FIGS. 3 and 4 in a position in which the device can function only as pump, FIG. 6 is an end view of the device in FIG. 5, FIG. 7 is a view of the device in FIGS. 5 and 6 but with the reversing valve in a position in which the device can be used for sealing and inflating a punctured tire, FIG. 8 is an end view of the device in FIG. 7.

DETAILED DESCRIPTION OF PREFERRED EMBODIMENTS

Figure 2:
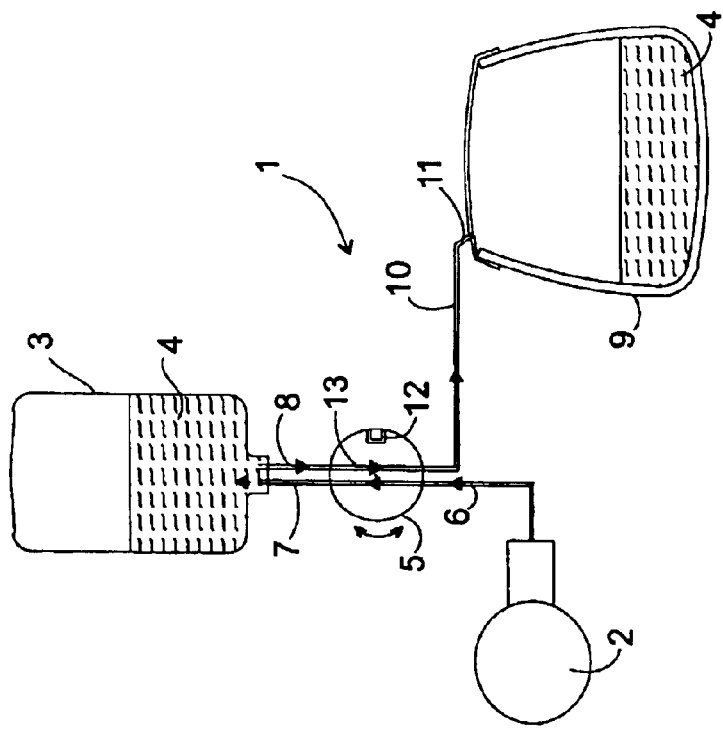
FIG. 2 is a view of the device in FIG. 1 but functioning to seal and inflate a punctured tire.

In a preferred embodiment, the reversing valve can be a rotary valve having opposite sliding faces on first and second valve parts having a first and second set of channels which, in a first mutual angular position of the two valve parts, are arranged to create an aperture through the valve in the first connection, and in a second angular position to create an aperture through the valve in the second connection, as the channels opening into the sliding faces in such a way that connected channels are communicating in the two mutual angular positions of the valve parts.

More specifically, first and second channels can be designed in the first valve part and third, fourth and fifth channels in the second valve part whereby the first, second and third channels are creating an aperture through the valve in the first connection whereas the first, second, fourth and fifth channels are creating an aperture through the valve in the second connection.

In a simple and expedient embodiment, each valve part can be disc-shaped, and the first, second, fourth and fifth channels can be transverse channels extending right through their respective valve parts whereas the third channel is extending between two outlets in the sliding face of the second valve part.

A new container filled with sealing agent can with advantage be provided with a sealing for ensuring that the sealing agent maintains its consistency until it is to be used for sealing a punctured object and the sealing therefore has to be broken.

For this purpose, the device can be provided with a plunger in a pneumatic cylinder connected to the container at an open end in such a way that the sealing is covering the aperture whereas the cylinder is divided by a partition into a first chamber at the sealing and a second chamber on the opposite side of the partition, the first chamber then being able to be connected to the fifth channel of the second valve and the second chamber with its fourth channel.

When the reversing valve is set in second position, the second chamber is on use now filled via its first and fourth channel with pressure gas which will push the plunger through the sealing of the container and thereby break the sealing. The pressure gas can then flow into the container via an axial channel in the plunger and drive the sealing agent out into the valve connection with the object, via the first chamber of the cylinder and the second and fifth channel. When the container is empty, the pressure gas will continue to flow via the container into the object which thereby is inflated.

In this connection, the plunger is designed with expedient guiding devices which will center and guide it along the interior wall of the pneumatic cylinder. These guiding devices are preferably designed as a light structure with tabs extending in the longitudinal direction of the plunger.

The overall function of the guide and the pneumatic cylinder and also the movable plunger is improved by the plunger at the lower face having a downwards extending pin which in its turn is introduced in a sleeve on the bottom of the cylinder.

In addition to this, the plunger has an axial flow channel provided with a nonreturn valve. Bores in the lower area of the tap connect the second chamber which has been pressurized first with the flow channel and thereby provide a passage for the pressure agent in the container.

The plunger will travel so far in its upper position in which the sealing of the container is broken till the bores are left clear but the pin still is guided in the sleeve which is on the bottom of the pneumatic cylinder.

When the plunger also is provided with a perforator facing the sealing and in form of e.g. at least one knife and/or point, a reliable and effective perforation of the container sealing is obtained when a punctured object is to be sealed with the sealing agent in the container and subsequently inflated.

Furthermore, the cylinder can be detachably connected to the second valve part via an intermediate piece having channels forming an extension of the fourth and fifth channel. Thereby, a simple extension between the pneumatic cylinder and the second part of the reversing valve is obtained.

When the device has been used for sealing and inflating a punctured object, residual sealing agent will to a greater or lesser extent remain in the intermediate piece and the cylinder, which therefore together with the cylinder easily can be removed and replaced by new parts so that the device is ready for operation again.

Residual sealing agent can also remain in the second channel of the first valve part, this channel can therefore be designed in an insert which is detachably mounted in the valve part and therefore can be replaced by a new one.

In an especially expedient embodiment, the pressure gas source can be built into a first housing whereas the container can be built into a second housing connected to the first one via the reversing valve so that the valve quite simply can be operated merely by turning the two housings in relation to each other.

The housings can be arranged in such a way that they are mainly flushing when the device is to be used for inflating e.g. a tire which has gone flat and be rotated a mutual angle of e.g. 90° when the device is to be used for sealing and inflating a punctured tire.

In the last-mentioned case, the first housing can stand on a base, for example the ground, and the second housing with the container can be upright so that the sealing agent advantageously is allowed to flow out of the container when the sealing is broken.

Figure 1:
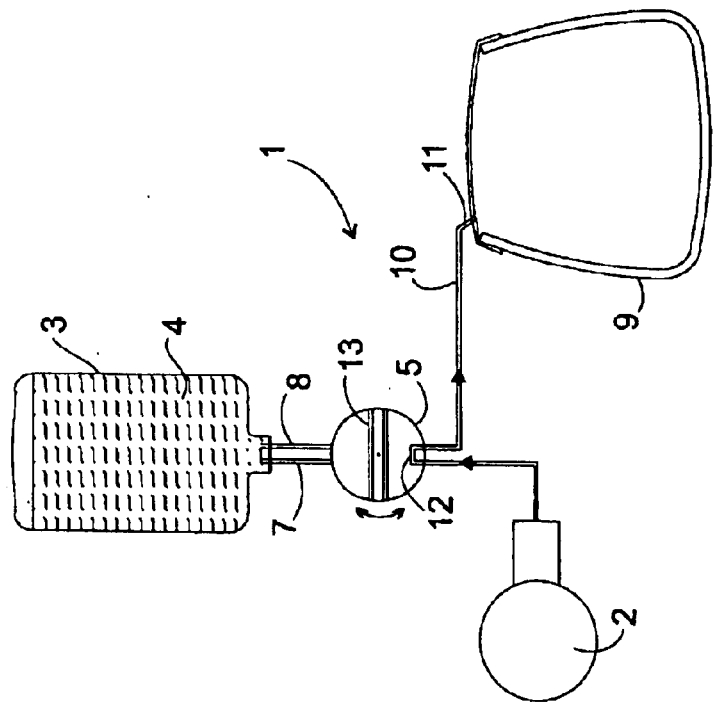
FIG. 1 is a diagrammatic view of a device according to the invention functioning as pump.

FIGS. 1 and 2 show the fundamental structure of a device 1 according to the invention. In FIG. 1, the device is used for inflating a tire having gone flat, and in FIG. 2 for sealing and inflating a punctured tire. In this case, the tire is assumed to be a car tire.

The main components of the device is a pressure gas source 2 which is assumed to be a compressor 2 in the case shown, a container 3 containing a sealing agent 4 for example a latex dispersion, and a reversing valve 5 connected to the compressor 2 via a first pipe 6, to the container 3 via a second and third pipe 7 and 8, and to a tire 9 via a fourth pipe 10 detachably connected to an inflation valve 11 on the tire 9. In the reversing valve 5, a first set of channels 12 and a second set of channels 13 are furthermore designed.

The reversing valve 5 shown diagrammatically in FIGS. 1 and 2 can actually be of any kind within the scope of the invention but it is here assumed to be a rotary valve which can be rotated between the first position in FIG. 1 and the second position in FIG. 2 as indicated by the arrow.

When the reversing valve 5 is in the first position, the tire 9 is, as shown in FIG. 1, connected to the compressor 2 via the first pipe 6, the first set of channels 12 of the reversing valve 5 and the fourth pipe 10. In this position, the device is used for inflating the tire to a desired pressure when the tire has gone flat.

When the reversing valve 5 is in the second position, the compressor 2 is, as shown in FIG. 2, connected to the container 3 via the first pipe 6, the second set of channels 13 and the second pipe 7 whereas the container 3 is connected to the tire 9 via the third pipe 8, the second set of channels 13, the fourth pipe 10 and the inflation valve 11 of the tire.

In this position, the device is used at a puncture to seal and inflate the tire 9, pressure air generated by the compressor flowing into the container 3 via the second pipe 7 and driving the sealing agent in this into the tire 9 via the third pipe 8, the fourth pipe 10 and the inflation valve 11.

When the container 3 is empty, the compressor is sending pressure air directly into the tire 9 via the now empty container 3. Thereby, the tire is inflated to the desired pressure.

Subsequently, the driver can advantageously drive a suitable distance in the car to distribute the sealing agent over the entire interior face of the tire and thereby ensure that the sealing agent will reach and seal the hole or holes in the punctured tire.

Figure 4:
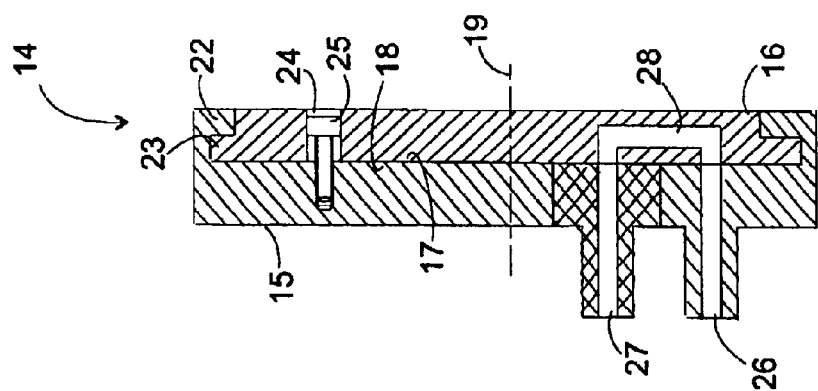
FIG. 4 is an axial sectional view of the reversing valve in FIG. 3 in assembled state.
Figure 3:
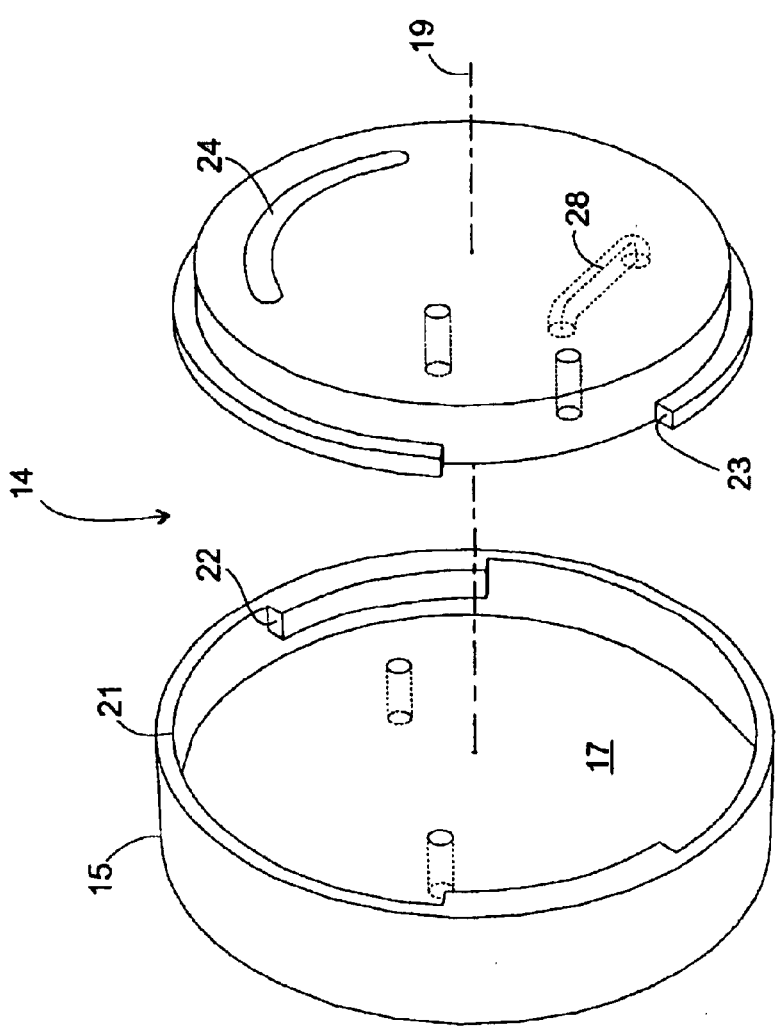
FIG. 3 is on a larger scale a perspective view of a reversing valve for the device in FIGS. 1 and 2 in disassembled state.

FIG. 3 is a perspective view of an expedient embodiment of a rotary valve 14 according to the invention in disassembled state, and FIG. 4 is an axial sectional view of this rotary valve in assembled state.

The rotary valve 14 consists of a first valve part 15 and a second valve part 16. The two valve parts 15 and 16 are both mainly disc-shaped and each provided with a sliding face 17 and 18 respectively. The two valve parts 15 and 16 of the rotary valve 14 can, with their sliding faces 17 and 18 in mutual sliding contact, be rotated an angle, for example 90°, in relation to each other about an axis of rotation 19.

On the first valve part 15, an annular collar 21 is designed which is extending outwards from the sliding face 17. On the collar 21, two opposite projections 22 are furthermore designed which are extending in a direction inwards towards the axis of rotation 19.

On the second valve part 16, two opposite projections 23 are furthermore designed which are extending in a direction outwards towards the axis of rotation 19.

The outwardly directed projections 23 are extending along a circle with a diameter corresponding to or slightly smaller than the inside diameter on the collar 21 of the first valve part 15, and they have an axial extent corresponding to or slightly smaller than the axial spacing between the inwardly directed projections 22 and the first sliding face 17 on the first valve part 15.

Each projection 23 is furthermore extending across a length of arc corresponding to or slightly smaller than the length of arc between the two inwardly directed projections 22 on the first valve part 15.

Assembling of the two valve parts now takes place by axially pushing the two projections 22 and 23 past each other and then rotate the valve parts in relation to each other so that the outwardly directed projection 23 on the second valve part 16 is guided behind the inwardly directed projection 22 on the first valve part 15.

The projections 22 and 23 are extending across such lengths of arc that they will not be disengaged when the two valve parts 15 and 16 of the rotary valve 14 are rotated mutually between first and second position.

The angle between first and second position can advantageously be between 10° and 170°, preferably between 30° and 140° and especially between 80° and 100°. The angle is determined by a stop consisting of a pin or screw 25 designed on the first valve part 15 and extending into or through a circularly extending groove 24 in the second valve part 16. In the example shown, the angle is 90°.

Naturally, the pin can also be designed as a spring-loaded pin in the first valve part and be displaced against the spring power on assembling of the valve parts after which the valve parts are inserted in each other and the projections 22 and 23 are engaged. The spring-loaded pin is then resting on semicircularly extending groove as soon as it enters this groove.

For safer guiding upon assembling, for example one of the valve parts can be provided with an additional central pin for centering and the other valve can be provided with a complementary receiver for such a pin.

In the rotary valve 14, channels are designed for in a first position opening the first connection in FIG. 1 between the compressor 2 and the tire 9 and in a second position opening the second connection in FIG. 2 between the compressor 2 and the tire 9 via the container 3.

For this purpose, first—and second channels 26 and 27 are designed in the first valve part 15 and third,—fourth—and fifth channels 28, 29 and 30 in the second valve part 16. The channels 26, 27 and 29, 30 are extending right through their respective valve parts 15 and 16 whereas the third channel 28 is extending inside the second valve part 16 and ending in two places in the sliding face 18 of this valve part. The position of the channels in relation to each other in the two positions of the valve and the thereby obtained mode of operation of the device will described in detail below.

FIGS. 5–8 show partly in section an advantageous embodiment of the device 1 according to the invention. In this case, the device has a first housing 31 with the compressor 2 and the second housing 32 with the container 3. The first housing 31 is closely connected to the first valve part 15 of the rotary valve 14 and the second housing 32 to the second valve part 16. The rotary valve 14 thus forms a hinge between the two housings 31 and 32 which thereby are allowed to rotate an angle of 90° in this case in relation to each other about the axis of rotation 19 of the rotary valve.

By simply rotating the two housings 31 and 32 90° in relation to each other, the device is thus changed between the mode of operation as pump in FIG. 1 and the mode of operation in FIG. 2 in which the device conveniently can be used for sealing and subsequently inflating a punctured tire.

Seen in cross section, the two housings 31 and 32 have mainly the same configuration. In FIGS. 5 and 6, the rotary valve 14 is in the first position, and the housings are extending in tandem of each other in the same direction as the axis of rotation 19 of the rotary valve with two opposite, mainly plane, parallel sides 33 and 34 respectively, and two opposite, cylinder-face shaped lateral sides 35 and 36 respectively, having the same axis as the axis of rotation 19 of the rotary valve.

In this position, the device is used as pump for inflating a tire 9 having gone flat, to a desired pressure. During this, the device can conveniently stand on a base, for example the ground (not shown), with one of the plane sides 33 and 34 respectively of the two housings.

In the position in FIGS. 7 and 8, the two housings 31 and 32 have now been rotated 90° in relation to each other and the rotary valve 14 is then in the second position in which the device has been changed over to seal and inflate a punctured tire.

During such an operation, the device can stand on a base, for example the ground (not shown), with one of the plane sides 33 of the first housing 31 and one of the cylinder-face shaped lateral sides 36 of the second housing 32, during this the lateral side is following the adjacent cylinder-face shaped lateral side of the first housing 31 so that both housings 31 and 32 are standing securely on the base.

As shown, the container is standing upright in the position of use in FIGS. 7 and 8 whereby the advantage is obtained in that the sealing agent easily is allowed to flow out of the container.

Figure 9:
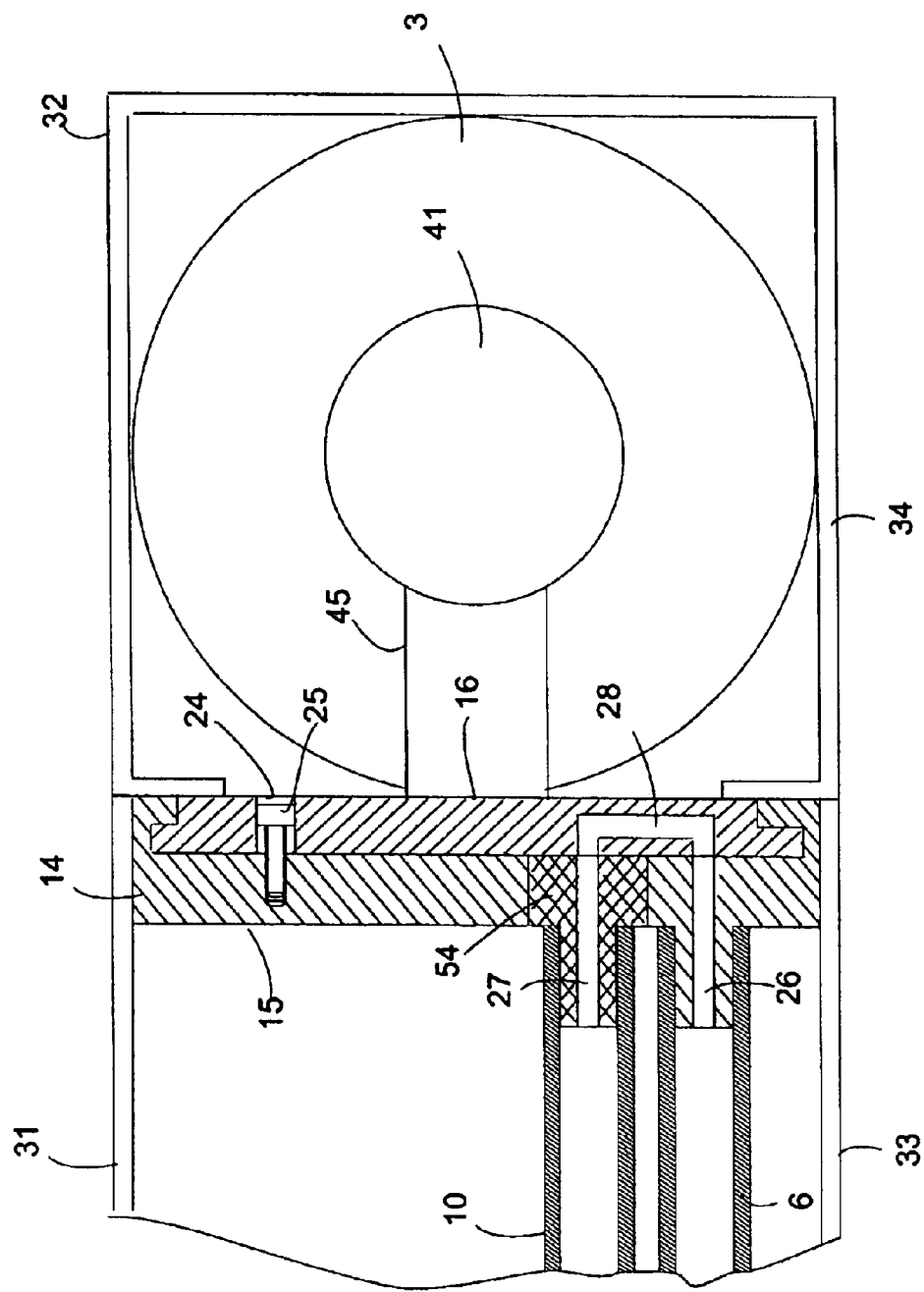
FIG. 9 is a fractional view of the device in FIGS. 1–8 functioning as pump.

FIG. 9 is a fractional view in more detail of the device 1 with the rotary valve 14 in first position in which the device, as shown in FIGS. 5 and 6, only is used as pump for inflating a tire having gone flat.

The first pipe 6, which is connected to the compressor 2, is connected to the first channel 26 in the first valve part 15 whereas the fourth pipe 10, which is connected to the tire 9, is connected to the second channel 27. The channels 26 and 27 are interconnected in the first valve position shown via the third channel 28 in the second valve part 16. On use, pressure air from the compressor is thereby driven in the direction of the arrows via the first pipe 6, the first channel 26, the third channel 28, the second channel 27 and the fourth pipe 10 into the not shown tire which thereby is inflated.

Figure 10:
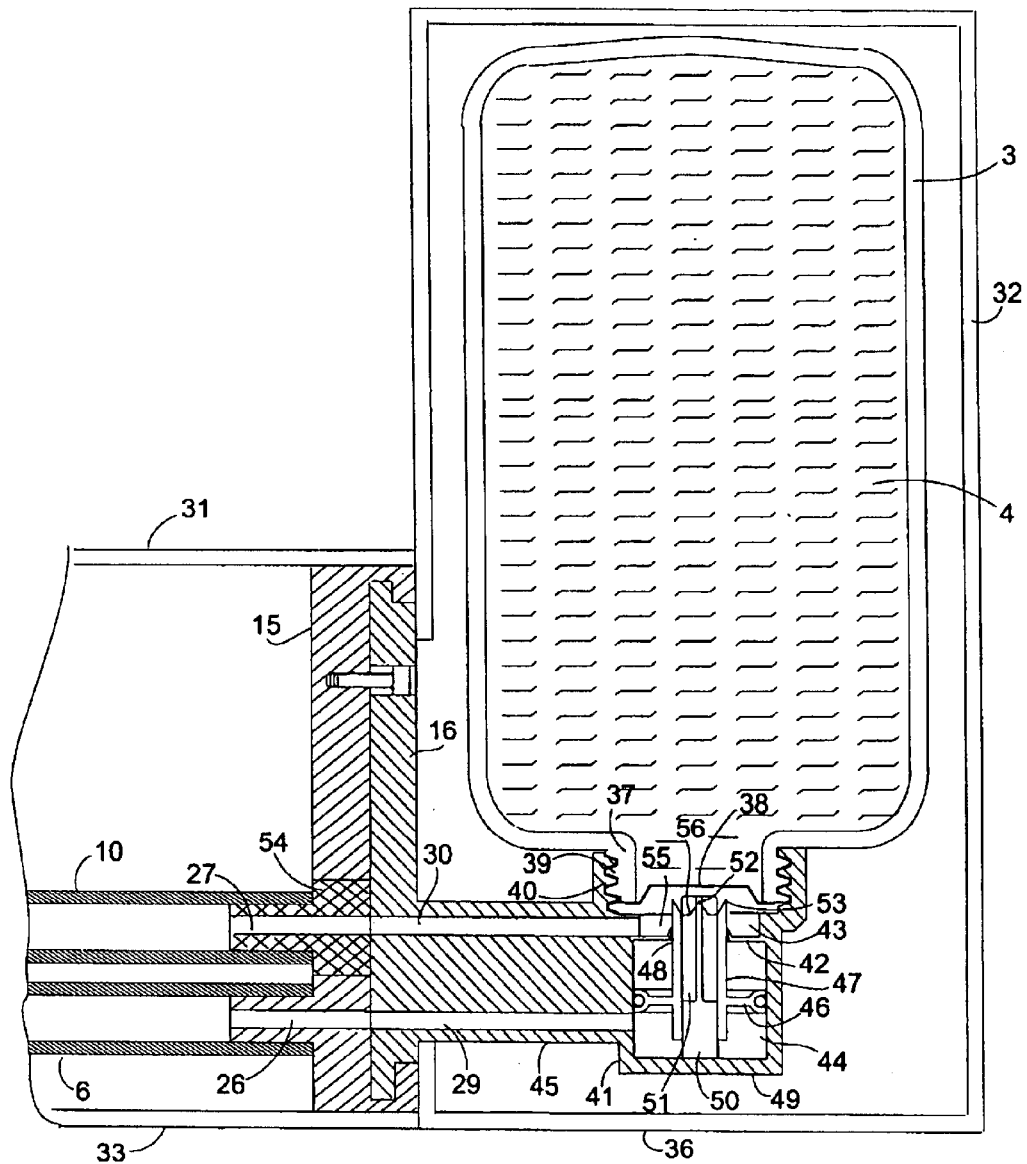
FIG. 10 is a view of the device in FIG. 9 but with the reversing valve set to a position, in which the device is functioning to seal and inflate the tire in FIGS. 1–2 and during this is in a first position.
Figure 11:
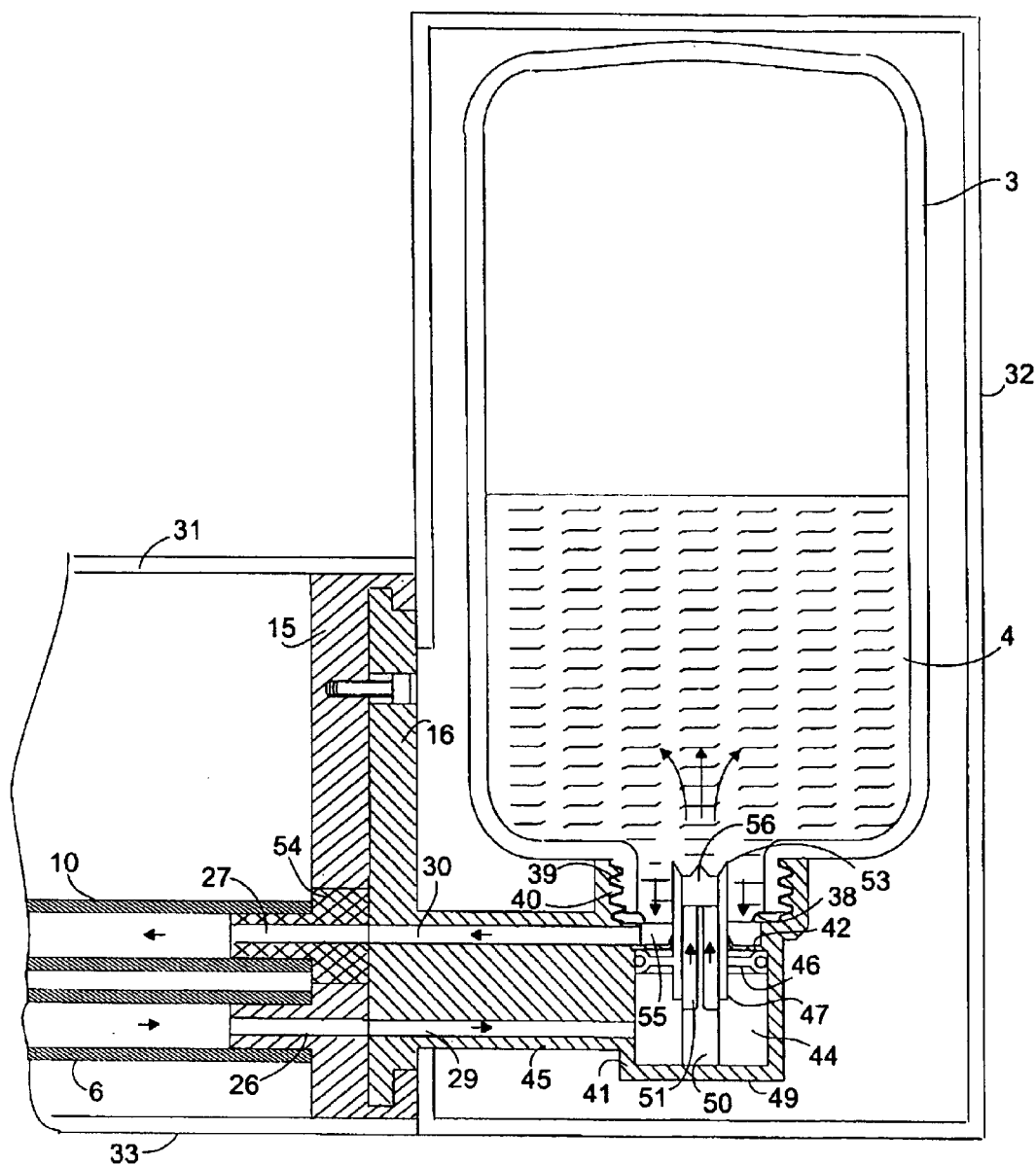
FIG. 11 is the view of the device in FIG. 9 in a second process step.
Figure 12:
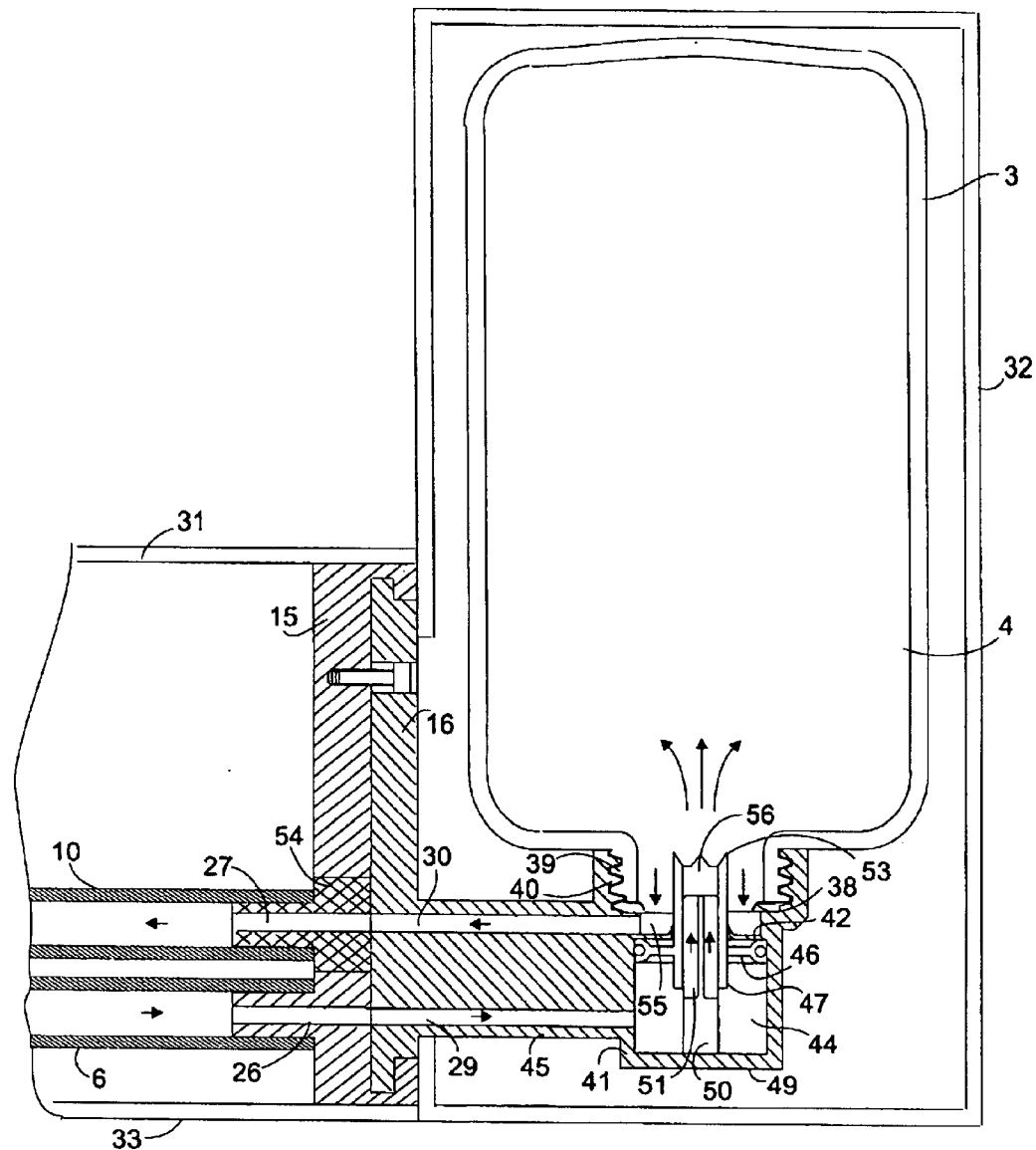
FIG. 12 is the view of the device in FIG. 9 in a third process step.

In FIGS. 10, 11 and 12, the two housings 31 and 32 are rotated an angle of 90° in relation to each other so that the rotary valve 14 now is in the second position in which the device can be used for sealing and inflating a punctured tire.

During such an operation, the device is placed in the way shown in FIGS. 7 and 9 where the container 3 advantageously is in an upright position allowing the sealing agent 4 to easily flow out of the container.

In this case, the container 3 is designed as a bottle with a neck 37 sealed with a sealing 38. By means of an external thread 39, the neck is screwed tightly into an internal thread 40 on a pneumatic cylinder 41 divided into upper—and lower chambers 43 and 44 by a partition 42.

Via an intermediate piece 45, the pneumatic cylinder 41 is fastened on the second valve part 16 of the rotary valve 14, the fourth channel 29 of this valve part being connected to the lower chamber 44 of the pneumatic cylinder 41 and the fifth channel 30 connected to the upper chamber 43 of the pneumatic cylinder 41.

In the pneumatic cylinder 41, a plunger 46 is movably located which is extending tightly through an aperture 48 in the partition 42 with a tubular central part 47.

At the bottom, the pneumatic cylinder 41 is closed by a base 49 provided with a pin 50 extending up into a flow channel 56 in the plunger 46. On a first section, the pin is closing tightly against the inside face of the tubular central part whereas it is designed with longitudinal grooves 51 on the subsequent section. At the top, the plunger is designed as a perforator 52 with knives or points 53 pointing at the sealing 38 of the bottle.

In the second position of the rotary valve 14 in FIGS. 10, 11 and 12, the first channel 26 of the first valve part is communicating with the fourth channel 29 of the second valve part and thereby with the lower chamber 44 of the pneumatic cylinder 41 whereas the second channel 27 of the first valve part is communicating with the fifth channel 30 of the second valve part and thereby with the upper chamber 43 of the pneumatic cylinder 41.

As the first channel 26 of the first valve part is connected to the compressor 2 via the pipe 6, pressure air will upon use flow, as indicated by the arrows, into the lower chamber 44 of the pneumatic cylinder 41 whereby a differential pressure is created above the partition 42, which pressure is affecting the plunger 26 with an upwardly directed force.

This force will drive the plunger 46 upwards whereby its perforator 52 will perforate the sealing 38 of the bottle and the plunger 46 expose the longitudinal grooves 51 of the pin 50.

This situation is shown in FIG. 11. The compressor is now sending, as indicated by the arrows, pressure air into the bottle 3 in form of an upwardly directed air jet via the pipe 6, the first channel 26, the second channel 29, the lower chamber 44, the grooves 51 of the pin 50 and the flow channel 56 of the pipe-shaped plunger 46

The pressure air is thereby driving the sealing agent out of the bottle 3 and via the upper chamber 43, the fifth chamber 30, the second channel 27 and the pipe 10 and into the punctured tire.

In FIG. 12, the total content of sealing agent of the bottle has now been driven into the tire whereby the flow of sealing agent is replaced by a flow of pressure air which will inflate the tire until the desired tire pressure has been reached.

Then, the tube 10 is removed from the inflation valve 11 of the tire 9 after which the driver will drive a suitable distance in order to distribute the sealing agent over the entire inside face of the tire during the rotation of the punctured tire so that it also can reach and seal the hole or holes in the punctured tire for certain.

Finally, the device is rotated back to the first position in which it will take up very little space and therefore conveniently can lie in e.g. the boot of the car.

When the device has been used for sealing holes in a punctured tire, residual sealing agent will, to a greater or smaller extent, remain in the parts that the sealing agent has passed during this. To put the device in a state fully ready for operation again, these parts have to be replaced by new ones and the bottle replaced by a new, sealed bottle full of sealing agent.

In the embodiment of the device according to the invention in FIGS. 9–12, the pneumatic cylinder 41, the intermediate piece 45 and the second valve part 16 of the valve 14 are made in one piece, that is as one single component joined to the first valve part 15 of the rotary valve in the simple manner described above. After use, this component can therefore together with the empty bottle quickly and easily be separated from the first valve part 15 and replaced by a new component with a new bottle.

The second channel 27 in the first valve part 15 will also be filled with sealing agent and is therefore constructed in an insert 54 which is detachably mounted in the first valve part 15 and therefore easily can be removed from this valve part together with the pipe 10 to be replaced by a new insert 54 and a new pipe 10.

Figure 13:
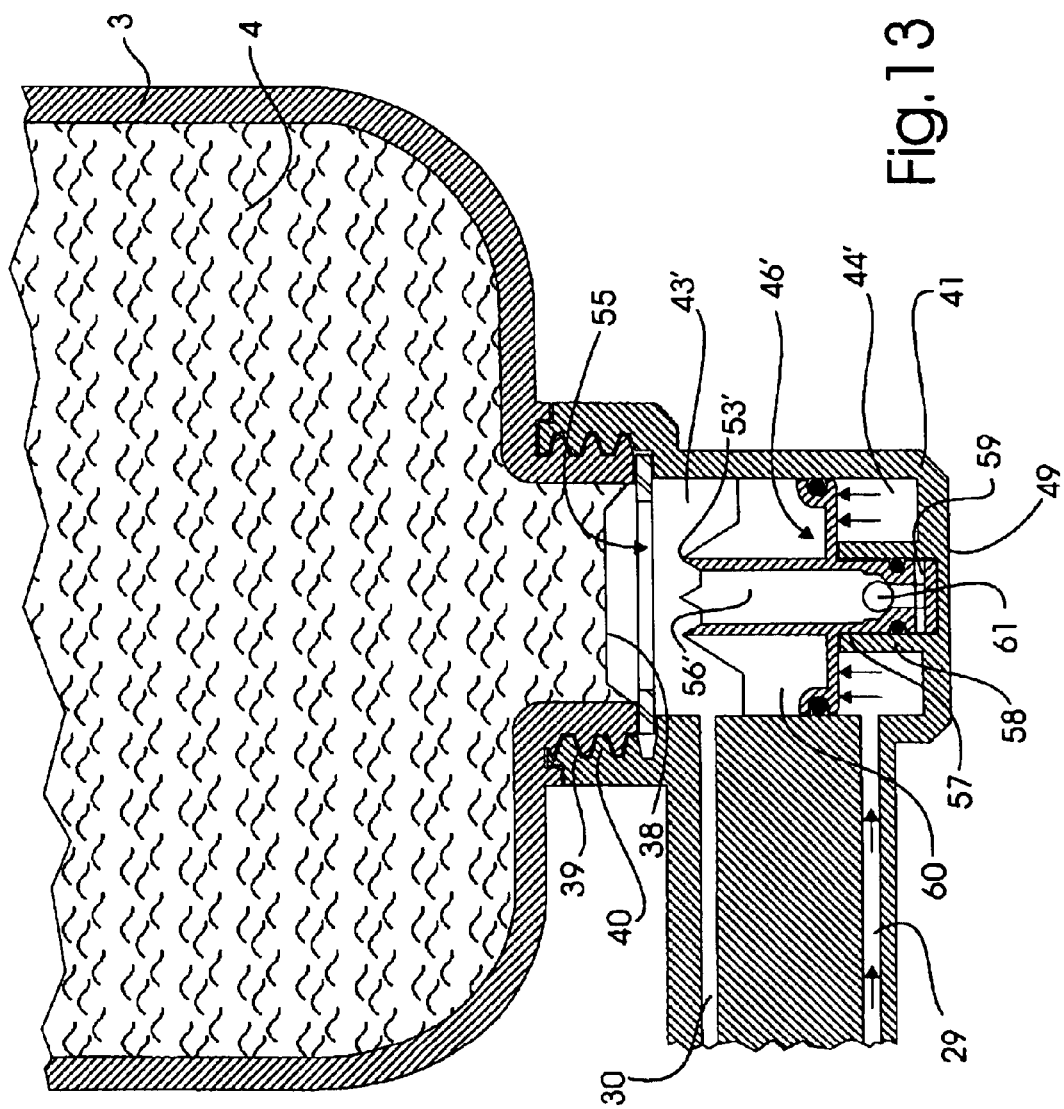
FIG. 13 shows a part of the device in a modified embodiment of the pneumatic cylinder and the plunger and in a first process step with the reversing valve in its second position.
Figure 14:
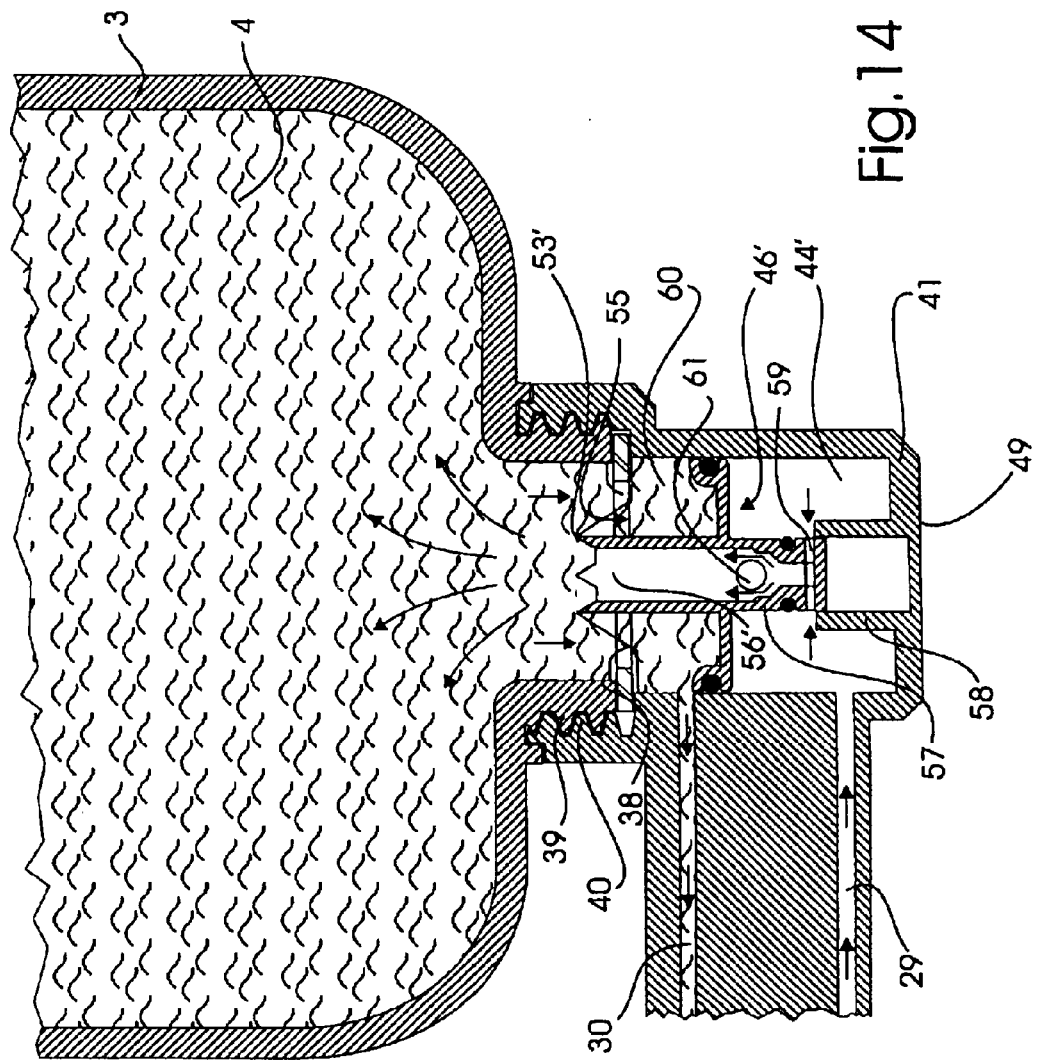
FIG. 14 is a view of the device in FIG. 13 in a second process step.
Figure 15:
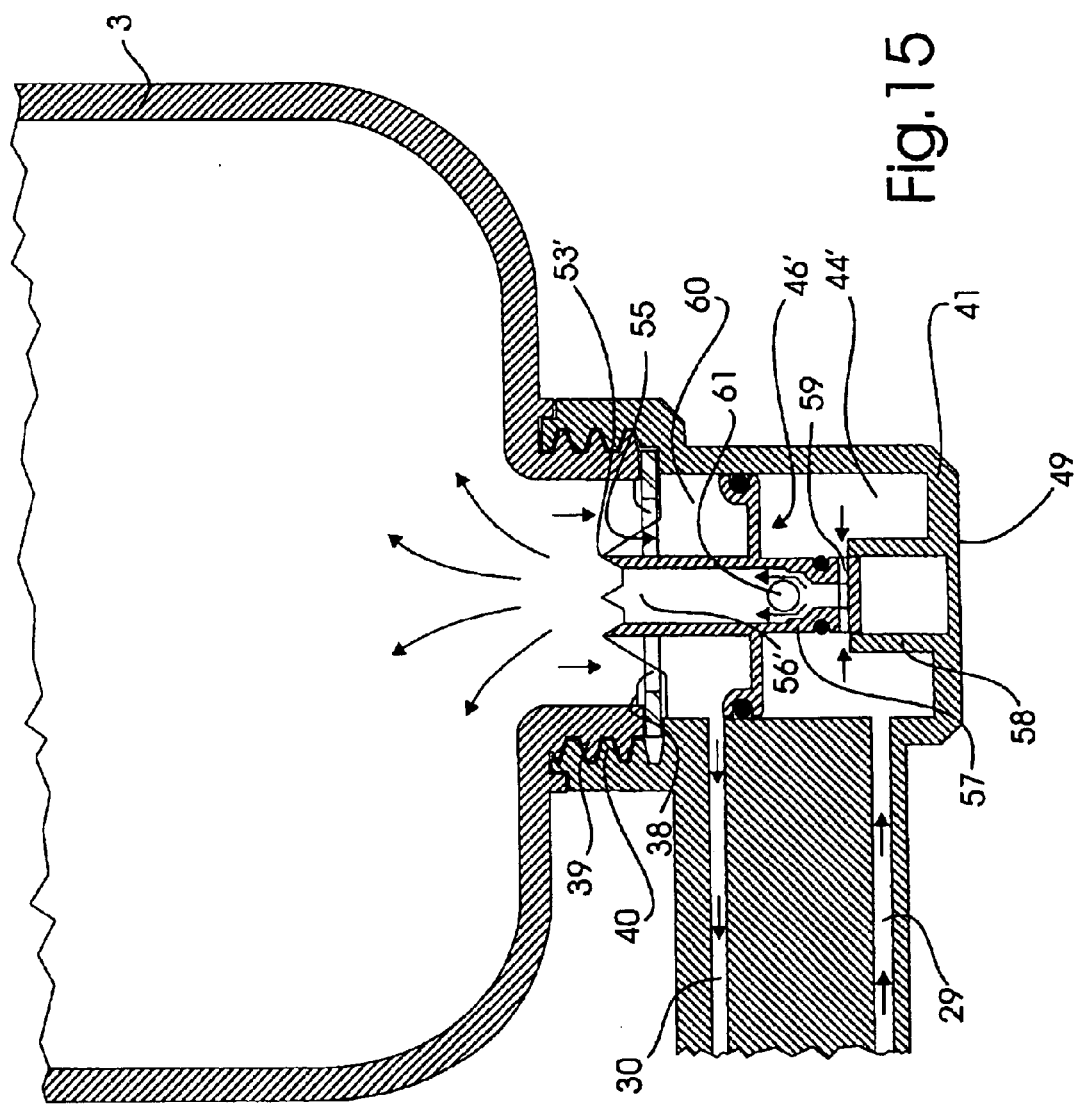
FIG. 15 is a view of the device in FIG. 13 in a third process step.

FIGS. 13, 14 and 15 show a part of the device in a modified embodiment of the pneumatic cylinder 41 and plunger 46 in FIGS. 10, 11 and 12. The same reference numerals are used for like parts whereas corresponding, but modified parts are designated by reference numerals, which only have been altered by an apostrophe.

Moreover, the device is functioning in the same manner as described with reference to FIGS. 10, 11 and 12, in which the reversing valve is in the second position and the device in case of a puncture is used for sealing and inflating the tire.

The plunger 46' has guiding devices 60 for guiding the plunger along the interior wall of the pneumatic cylinder 41. In this case, the guiding devices are designed as tabs 60 extending in the longitudinal direction of the plunger.

Furthermore, the plunger 46' has an axial flow channel 56' and a downwards extending pin 57 on the lower face and also bores in its lower area.

Furthermore, a nonreturn valve 61 is located inside the flow channel 56 and is opening towards the container in the direction of flow and serving for preventing sealing agent 4 in the container 3 from reaching the compressor 2 via the lower chamber 44, the forth channel 29 and the pipe 6.

Additionally, a sleeve 58 is found in the pneumatic cylinder 41 into which sleeve the pin 57 is guided until the perforator 52 of the plunger 46 is in an area within the sealing 38 upon use.

FIG. 13 shows the starting position for sealing and inflating a punctured tire with the valve in its second position. The plunger is in its lower position in which the sleeve 58 is blocking the bores 59 of the pin 57.

In FIG. 14, the pressure air from the compressor is supplied to the lower chamber 44 via the fourth channel 29 whereby the differential pressure above the partition 42 is driving the plunger to its upper position.

In this upper position, the perforator 52 of the plunger has perforated the sealing 38 and the sleeve 58 has simultaneously left the bores 59 of the pin 57 clear so that pressure air is led into the container 3 via the bores 59 and the axial flow channel 56'.

The pressure air is thereby driving the sealing agent out of the container and into the leaky tire via the fifth channel 30 until the container is empty.

This situation is illustrated in FIG. 15 in which pressure air is led via the now empty container to the tire for inflating this tire.

Figure 16:
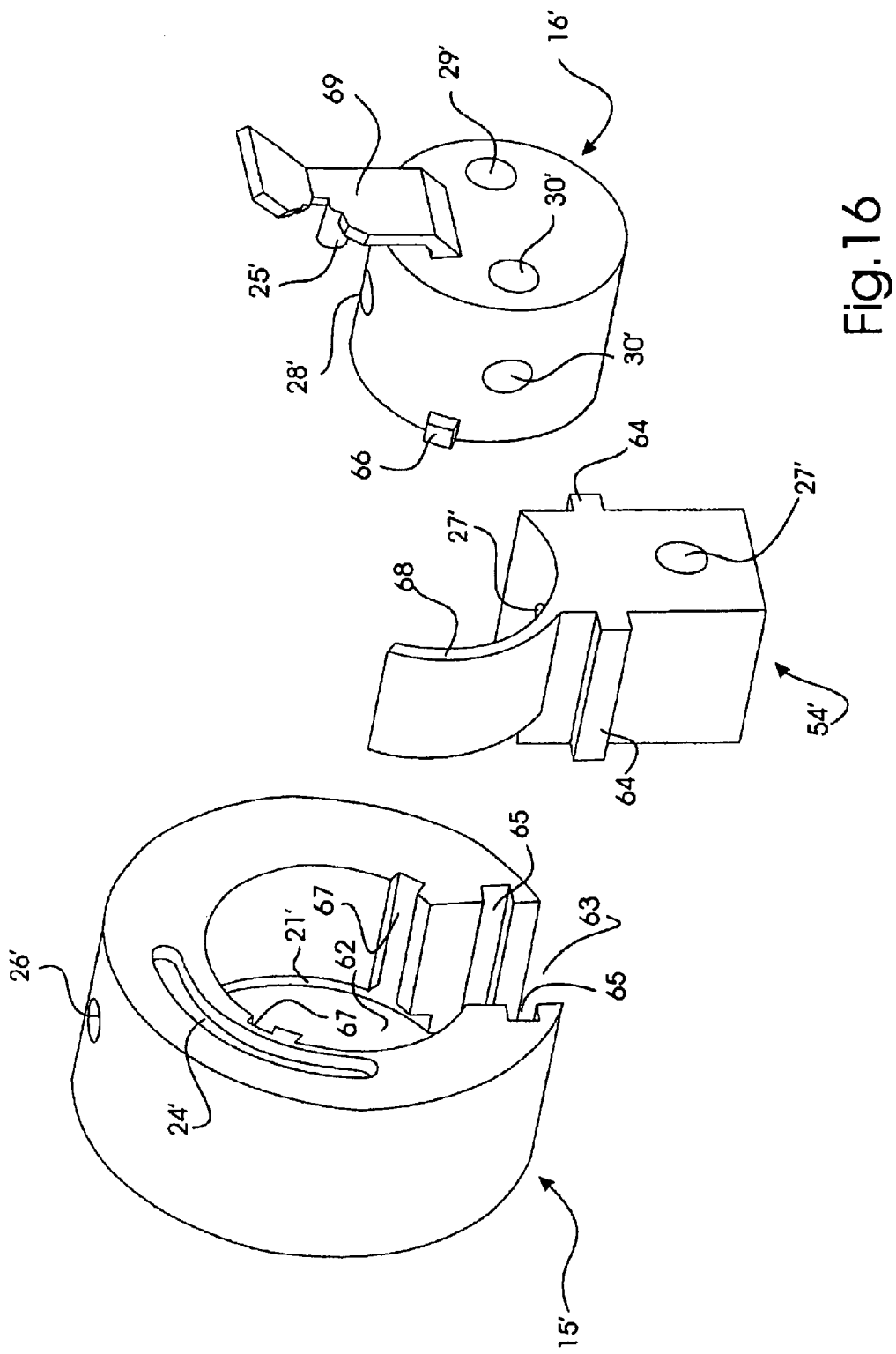
FIG. 16 is a perspective view of a second embodiment of the reversing valve in disassembled state.

FIG. 16 is a fractional view of a second embodiment of the reversing valve in FIGS. 3, 4, 9, 10, 11 and 12. Like parts are designated by the same reference numerals whereas corresponding but modified parts are designated by reference numerals which only have been altered by an apostrophe.

Figure 17:
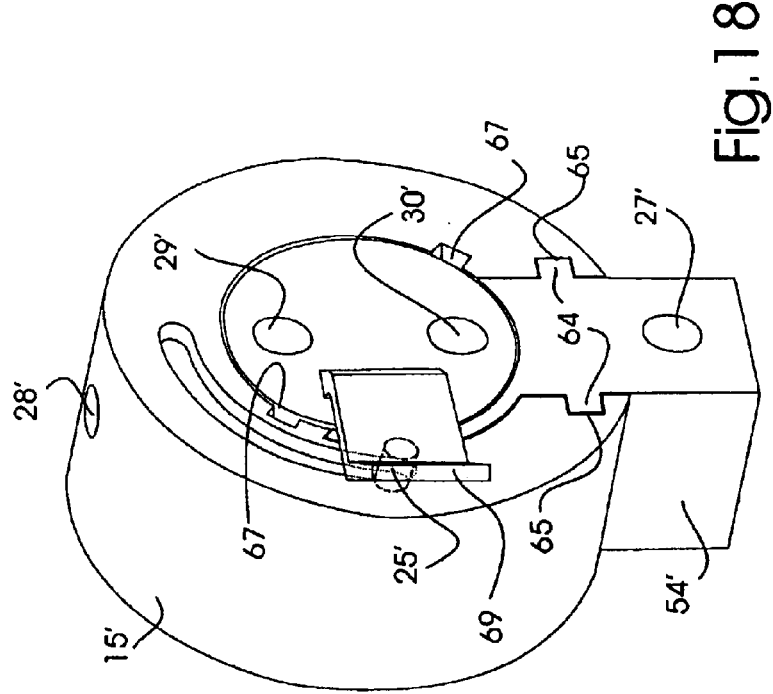
FIG. 17 is an end view of the reversing valve in FIG. 15 in assembled state with the reversing valve in its first position.
Figure 18:
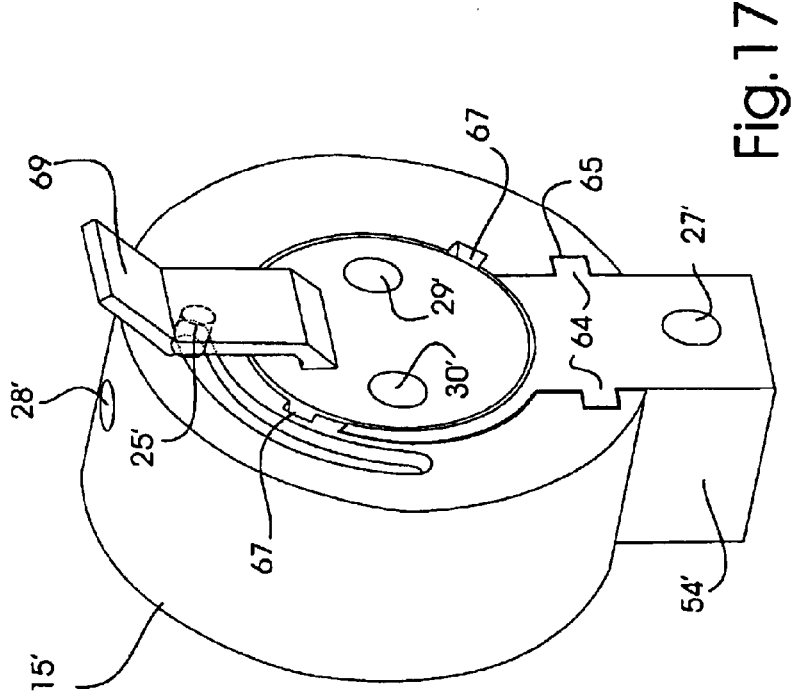
FIG. 18 is an end view of the reversing valve in FIG. 15 in assembled state with the reversing valve in its second position.
Figure 19:
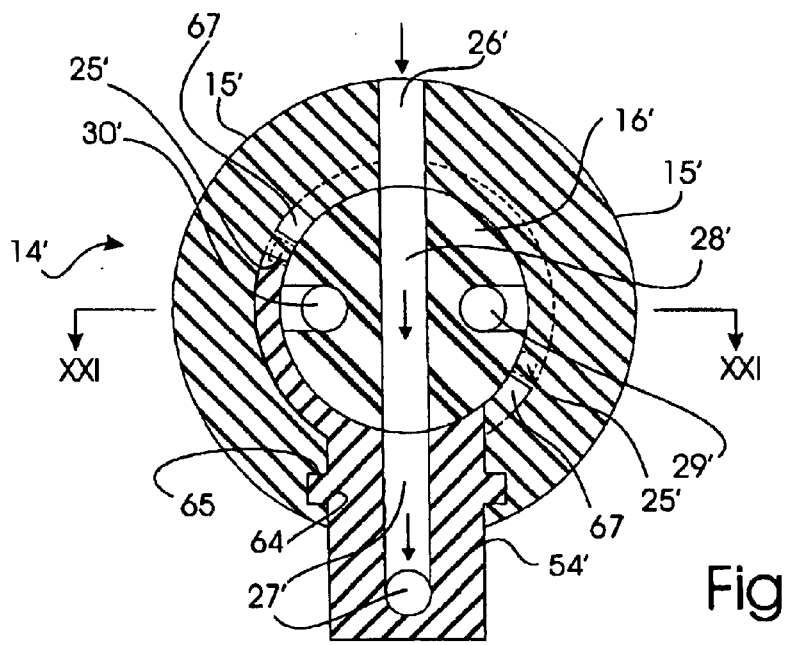
FIG. 19 is a cross-sectional view of the reversing valve in FIG. 17 in its first position.
Figure 20:
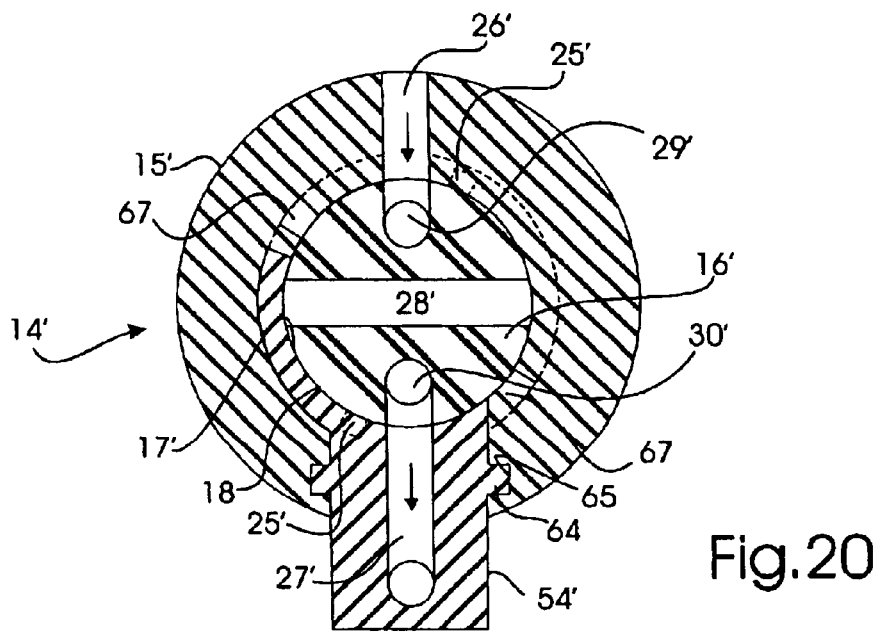
FIG. 20 is a cross-sectional view of the reversing valve in FIG. 18 in its first position.
Figure 21:
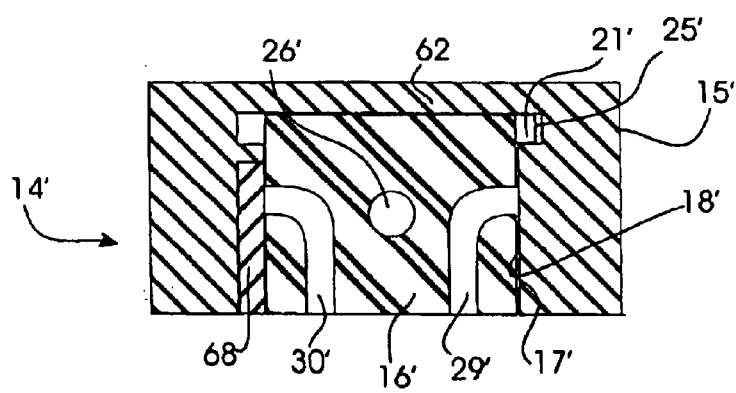
FIG. 21 is a sectional view taken along the line XXI—XXI in FIG. 19.

FIGS. 17 and 19 are end and cross-sectional views respectively of the reversing valve in assembled state with the reversing valve in its first position, and FIGS. 18 and 20 are end and cross-sectional views respectively of the reversing valve in assembled state with the reversing valve in its second position whereas FIG. 21 is a cross-sectional view perpendicular to the first cross section of the assembled reversing valve.

The reversing valve is a rotary valve 14' with first and second valve parts 15', 16' and an insert part 54' for insertion in the first valve part. This valve part 15', 16', 54' corresponds to the valve parts 15, 16 and insert part 54 of the first embodiment.

The valve parts 15' and 16' are designed with opposite, cylindrical sliding faces 17' and 18'. The sliding face 17' is located on the valve part 15' and the insert part 54' of the first valve part.

The rotary valve 14' is furthermore provided with a first set of channels 26', 27' in the first valve part 15', 54', and a second set of channels 28', 29', 30' in the second valve part 16'.

In the angular position of the rotary valve 14' shown in FIGS. 17, 19 and 21, the first channel 26' and the second channel 27' of the first valve part 15', 54' are communicating with each other via the third channel 28' of the second valve part 16'. As in the first embodiment, the second embodiment of the device is only functioning as pump for inflating a tire, which has gone flat, in this first position.

In the second angular position of the rotary valve 14' shown in FIGS. 18 and 20, the first channel 26' and the second channel 27' of the first valve part 15', 54' are communicating with each other via the fourth channel 29', the container 3 and the fifth channel 30'. As in the first embodiment, the second embodiment of the device is functioning to seal and subsequently inflate a tire which has become leaky.

The further design of the second embodiment of the rotary valve 14' follows from the subsequent description.

The first valve part 15' is designed as a cylindrical casing and is provided with a bottom 62. The wall of the casing has a slot 63 for receiving the insert part 54' which is shaped complementarily to this slot and which is provided with two projecting keys 64 fitting into the two slots 65 slotted in the casing wall.

The second valve part 16' is cylindrical and designed complementarily compared to the internal chamber in the casing of the first valve 15', 54' and it can be rotated in this internal chamber in the casing between the first and second angular positions.

The first channel 26' is extending radially through the first valve part 15'. The second channel 27' is extending inside the insert part 54' radially in the area of the cylindrical casing and axially in relation to the cylindrical casing towards the outlet in the object side. The third channel 28' is extending radially and centrally through the second valve part 16'. And the fourth channel 29' and the fifth channel 30' have outlets in the end face and circumference respectively of the second valve part 16'.

To rotatably keep the second valve part 16' in the correct position in the first valve part 15', an annular slot 21' (FIG. 21) is slotted in the casing wall along the internal periphery, and the second valve part 16' is provided with two projections 66 and is rotatably inserted in this slot 21' and in the casing via slots 67 slotted in the casing wall crosswise to the slot 21'. In addition, the insert part 54' is provided with an arcuated tab 68 inserted in the wall on the casing of the first valve part.

When the device for sealing and inflating a tire, which has become leaky, has been used, the parts which were in contact with the sealing agent then have to be replaced, among others the second valve part 16' and the insert part 54'.

The peripheral mouth of the fifth channel 30 through which sealing agent has flown is however only moved along the tab of the insert part 54' when the second valve part 16' is rotated from the position of use to the position of disassembling.

In this way, the first valve part 15' will not contact the sealing agent and is therefore not replaced.

Both valve parts 15', 16' are provided with stops 24', 25' defining the first and second position of the rotary valve 15', 16', whereby the stops consist of the ends of a coaxial groove 24' made in the first valve part 15' and a pin 25' fixed on a tap 69 on the second valve part 16' and extending into the groove 24'.

The stops 24' and 25' are arranged in such a way that the angle between the first and second position of the reversing valve forms between 10° and 170°, preferably between 30° and 140° and especially between 80° and 100°.

The device according to the invention is a small, handy unit which is quick and easy to operate and which therefore renders the heavy and bulky spare wheel dispensable that drivers traditionally have in the car. By using the device according to the invention instead, the space and load capacity which the spare wheel used to occupy can now be utilized.

The device according to the invention is described above and shown in drawing on the assumption that it was used for inflating a car tire having gone flat or for sealing and inflating a car tire having punctured.

Naturally, this is only to be taken as an example as the device within the scope of the invention just as well can be used for performing the same operations on other tires or other inflatable objects.

What is claimed is:

1. A device for sealing and inflating an inflatable object provided with an inflation valve, which comprises a pressure gas source, a container containing a sealing agent, and a reversing valve for opening a first connection between the pressure gas source and the inflation valve of the object in a first position and for opening a second connection between the pressure gas source and the container and further between this container and the inflation valve of the object in a second position.

2. A device according to claim 1, wherein the reversing valve is a rotary valve having opposite sliding faces on first and second valve parts having first and second sets of channels arranged to, in a first mutual angular position of the two valve parts, create an aperture through the valve in the first connection and, in a second angular position, create an aperture through the valve in the second connection, with the channels opening into the sliding faces in such a way that connected channels are communicating in the two positions of the rotary valve.

3. A device according to claim 2, wherein first and second channels are designed in the first valve part and third, fourth and fifth channels are designed in the second valve part, wherein the first, second and third channels create an aperture through the rotary valve in the first connection, and wherein the first, second, fourth and fifth channels create an aperture through the rotary valve in the second connection.

4. A device according to claim 2, wherein each valve part is mainly disc-shaped and that the first, second, fourth and fifth channels are transverse channels extending through their respective valve parts, whereas the third channel extends between two outlets in the sliding face of the second valve part.

5. A device according to claim 2, wherein the first disc-shaped valve part along the periphery has an annular collar projecting from the sliding face of this part, and that the second disc-shaped valve part is rotatably inserted in this collar.

6. A device according to claim 2, wherein at least one inwardly directed projection is designed on the collar of the first valve part at a distance from the sliding face, and that at least one outwardly directed, peripheral projection fitting in the space between the sliding face of the first valve part and the inwardly directed projection on its collar is designed on the second valve part, with the outwardly directed projection having a cut-out section extending over the same or a greater length of arc than the inwardly directed projection of the collar.

7. A device according to claim 2, wherein the two valve parts are provided with stops defining the first and second position of the rotary valve.

8. A device according to claim 2, wherein the stops include ends in a coaxially designed groove in one of the valve parts and a pin in-that is secured on the second valve part and extending into the groove.

9. A device according to claim 2, wherein the angle between the first and second position of the reversing valve is between 10° and 170°.

10. A device according to claim 2, wherein at least the second channel in the first valve part is designed in an insert detachably mounted in this valve part.

11. A device according to claim 1, wherein the reversing valve is a rotary valve having opposite sliding faces on first and second valve parts and an insert part having first and second sets of channels arranged to, in a first mutual angular position of the three valve parts, create an aperture through the valve in the first connection and in a second angular position, create an aperture through the valve in the second connection, with the channels communicating in such a way in the sliding faces that connected channels are communicating in the two positions of the rotary valve.

12. A device according to claim 11, wherein first and second channels are designed in the first valve part and the associated insert part and third, fourth and fifth channels are designed in the second valve part, whereby the first, second and third channels create an aperture through the rotary valve in the first connection whereas the first, second, fourth and fifth channels create an aperture through the rotary valve in the second connection.

13. A device according to claim 11, wherein: the first valve part is designed as a cylindrical casing that optionally includes a bottom; the wall in the casing of the valve part has a slot for receiving the insert part which is shaped complementarily to this slot; and the second valve part is designed mainly cylindrical and complementary to the internal chamber in the housing of the first valve part.

14. A device according to claim 11, wherein
the first channel extends radially through the first valve part designed as cylindrical casing,
the second channel extends inside the insert part radially in the area of the cylindrical casing and axially in relation to the cylindrical casing towards the outlet in the object side,
the third channel extends radially and centrally through the second valve part, and
the fourth channel and the fifth channel have outlets in the end face and circumference respectively of the second valve part.

15. A device according to claim 11, wherein the first valve part along its internal periphery has an annular slot slotted in its sliding face, and that the second valve part is rotatably inserted in the annular slot and the casing by means of projections.

16. A device according to claim 11, wherein the first and second valve parts are both provided with stops defining the first and second positions of the rotary valve.

17. A device according to claim 11, wherein the stops include ends of a coaxial groove made in one of the first or second valve parts and a pin extending into the groove and fixed on the other of the first or second valve part.

18. A device according to claim 11, wherein the angle between the first and second positions of the reversing valve is between 10° and 170°.

19. A device according to claim 1, wherein the device comprises a pneumatic cylinder having a base in one end, an aperture in the other end, and a plunger displaceable in direction towards the aperture; the container is provided with a seal for hermetically sealing the container; the container is mounted on the pneumatic cylinder at the aperture of this cylinder, which aperture thereby is covered by the seal; the plunger extends tightly through a partition dividing the pneumatic cylinder into a first chamber located nearest the seal and communicating with the fifth channel, and a second chamber located on the opposite side of the partition and communicating with the fourth channel; the plunger upon use is displaced from the starting position in which its end part facing the seal of the container is outside the seal to a final position in which the end part is inside the seal the plunger has an axial flow channel; and a pin is provided in the pneumatic cylinder for filling this channel until the end part upon use is at least in an area within the seal.

20. A device according to claim 1, which further comprises a pneumatic cylinder having a base in one end and aperture in the other end and a plunger displaceable in direction towards the aperture, and wherein the container is provided with a seal for hermetically sealing the container; the container is mounted on the pneumatic cylinder at the aperture of this cylinder, which aperture thereby is covered by the seal, whereby the plunger is dividing the pneumatic cylinder into a first chamber located nearest the seal and communicating with the fifth channel, and a second chamber communicating with the fourth channel; the plunger upon use is displaced from a starting position in which its end part facing the seal of the container is outside the seal, to a final position in which the end part is inside the seal, that the plunger has an axial flow channel; the plunger furthermore has a downwardly extending pin on its lower face; a sleeve is located in the pneumatic cylinder, into which sleeve the pin is guided until the end part is at least in an area within the seal, whereby a nonreturn valve is arranged inside the flow channel and is opening in the direction of flow towards the container; and that the pin in its lower area has bores connecting the flow channel with the second chamber when the end part upon use is located within the seal.

21. A device according to claim 19, wherein the plunger has guiding devices extending in the longitudinal direction of the plunger for guiding the plunger along the interior wall of the pneumatic cylinder.

22. A device according to claim 19, wherein the end part of the plunger is designed as a perforator having at least one knife or point.

23. A device according to claim 19, wherein the pneumatic cylinder is detachably connected to the second valve part via an intermediate piece having channels constituting an extension of the fourth and fifth channel.

24. A device according to claim 1, wherein the pressure gas source is located in a first housing and the container in a second housing rotatably connected to the first one via the rotary valve.

25. A device according to claim 24, wherein each housing is defined by two preferably parallel side walls extending mainly in the same direction as the axis of rotation of the rotary valve, two transverse walls extending between the side walls, and two preferably parallel end walls extending crosswise to the axis of rotation; and at least the side walls of the housings extend mainly in tandem of each other in the first position of the rotary valve.

26. A device according to claim 24, wherein at least one of the transverse walls in each housing extends mainly along a cylindrical plane having the same axis as the rotary valve.

27. A method for inflating for example a tire by means of the device according to claim 1, wherein the method comprises the following process steps
the reversing valve being set in first position,
a pipe connected to the second channel in the first valve part being detachably connected to the inflation valve of the tire,
the pressure gas source being activated, and
the pressure gas source being deactivated when the tire has been inflated.

28. A method for mending a punctured tire by means of the device according to claim 1, wherein the method comprises the following process steps
the reversing valve being set in second position,
a pipe connected to the second channel in the first valve part being detachably connected to the inflation valve of the tire,
the pressure gas source being activated, and
the pressure gas source being deactivated when the tire has been inflated.

29. A device for sealing and inflating an inflatable object provided with an inflation valve, and of the kind that comprises a pressure gas source and a container containing a sealing agent and sealed by a seal which comprises a pneumatic cylinder having a base in one end and an aperture in another end, a plunger displaceable in direction towards the aperture, with the container being mounted on the pneumatic cylinder at the aperture of this cylinder, which thereby is covered by the seal, the plunger extending tightly through a partition dividing the pneumatic cylinder into a first chamber located nearest the seal and connectable to the object, and a second chamber located on the opposite side of the partition and connected to the pressure gas source, with the plunger upon use being displaced from a starting position in which its end part facing the seal of the container is outside the seal to a final position in which the end part is within the seal, the plunger having an axial flow channel, and a pin located in the pneumatic cylinder, which fills this channel until the end part is in an area within the seal.

30. A device according to claim 29, wherein the end part of the plunger is designed as a perforator having at least one knife or point.

31. A method for inflating for example a tire by means of the device according to claim 29, wherein the method comprises the following process steps the reversing valve being set in first position, a pipe connected to the second channel in the first valve part being detachably connected to the inflation valve of the tire, the pressure gas source being activated, and the pressure gas source being deactivated when the tire has been inflated.

32. A method for mending a punctured tire by means of the device according to claim 29, wherein the method comprises the following process steps the reversing valve being set in second position, a pipe connected to the second channel in the first valve part being detachably connected to the inflation valve of the tire, the pressure gas source being activated, and the pressure gas source being deactivated when the tire has been inflated.

33. A device for sealing and inflating an inflatable object provided with an inflation valve, which comprises a pressure gas source, a container containing a sealing agent, a first housing for the pressure gas source, a second housing for the container, with the two housings rotatably interconnected via a rotary valve for opening a first connection between the pressure gas source and the inflation valve of the object in a first position and for opening a second connection between the pressure gas source and the container and between this container and the valve of the object in a second position.

34. A device according to claim 33, wherein the two housings both have a side serving for supporting on a base when the device only is used as pump, and the supporting side of the first housing serves for supporting the device against a base when it alternatively is used for sealing and inflating a punctured object while the supporting side of the second housing is rotated by an angle in relation to the supporting side of the first housing.

35. A method for inflating for example a tire by means of the device according to claim 33, wherein the method comprises the following process steps the reversing valve being set in first position, a pipe connected to the second channel in the first valve part being detachably connected to the inflation valve of the tire, the pressure gas source being activated, and the pressure gas source being deactivated when the tire has been inflated.

36. A method for mending a punctured tire by means of the device according to claim 33, wherein the method comprises the following process steps the reversing valve being set in second position, a pipe connected to the second channel in the first valve part being detachably connected to the inflation valve of the tire, the pressure gas source being activated, and the pressure gas source being deactivated when the tire has been inflated.

* * * * *